US008497798B2

(12) United States Patent
Schloetzer

(10) Patent No.: US 8,497,798 B2
(45) Date of Patent: Jul. 30, 2013

(54) DEVICE AND METHOD FOR THREE-DIMENSIONAL POSITIONING

(75) Inventor: Susanne Schloetzer, Neudrossenfeld (DE)

(73) Assignee: Astrium GmbH, Taufkirchen (DE)

( * ) Notice: Subject to any disclaimer, the term of this patent is extended or adjusted under 35 U.S.C. 154(b) by 209 days.

(21) Appl. No.: 13/211,453

(22) Filed: Aug. 17, 2011

(65) Prior Publication Data
US 2012/0044104 A1 Feb. 23, 2012

(30) Foreign Application Priority Data
Aug. 18, 2010 (DE) .......................... 10 2010 034 792

(51) Int. Cl.
*G01S 13/06* (2006.01)

(52) U.S. Cl.
USPC .................. 342/32; 342/33; 342/34; 342/35; 342/37; 342/38; 342/357.2; 701/470; 701/500

(58) Field of Classification Search
USPC ............... 342/32, 33, 35, 37, 357.2; 701/470, 701/500
See application file for complete search history.

(56) References Cited

U.S. PATENT DOCUMENTS

| | | | | |
|---|---|---|---|---|
| 7,805,245 | B2* | 9/2010 | Bacon et al. | 701/507 |
| 7,821,457 | B2* | 10/2010 | Martin et al. | 342/463 |
| 8,013,789 | B2* | 9/2011 | van Graas et al. | 342/357.46 |
| 8,019,538 | B2* | 9/2011 | Soehren et al. | 701/510 |
| 8,224,574 | B2* | 7/2012 | Tazartes et al. | 701/500 |
| 2006/0049977 | A1 | 3/2006 | Vacanti | |
| 2006/0071851 | A1* | 4/2006 | Graas et al. | 342/357.14 |
| 2006/0224321 | A1* | 10/2006 | Lund et al. | 701/220 |
| 2009/0030605 | A1 | 1/2009 | Breed | |
| 2009/0140887 | A1 | 6/2009 | Breed et al. | |
| 2010/0299003 | A1* | 11/2010 | Hanson et al. | 701/4 |
| 2012/0044104 | A1* | 2/2012 | Schloetzer | 342/128 |
| 2012/0162014 | A1* | 6/2012 | Wu et al. | 342/387 |
| 2012/0326923 | A1* | 12/2012 | Oehler et al. | 342/357.29 |

OTHER PUBLICATIONS

European Search Report including partial English language translation dated Nov. 25, 2011 (Eight (8) pages).
SYMWO Absolute Positioning, SYMEO Local Positioning Radar, Symeo GmbH, 2009, pp. 1-88.
NATO Air Force Armaments Group, NATO Unclassified, Cost benefit Analysis on PALS, Final Report, Jul. 3, 2007, pp. 1-151, vol. II, Main Report (One hundred fifty-two (152) pages).
Clark E. Cohen et al., "Precision Landing of Aircraft Using Integrity Beacons," Stanford University, Chapter 15, pp. 427-459.
R. L. Greenspan, "GPS and Inertial Integration," Clarks Stark Draper Laboratories, Chapter 7, pp. 187-220.

* cited by examiner

*Primary Examiner* — John B Sotomayor
(74) *Attorney, Agent, or Firm* — Crowell & Moring LLP

(57) ABSTRACT

A device and method for three-dimensional positioning are provided. The three-dimensional positioning of a common reference point is determined by fusion of supplied measurements, taking into account a lever arm compensation between the reference point, a global navigation satellite system (GNSS) receiver antenna, at least one radar antenna, and an inertial measuring unit.

14 Claims, 4 Drawing Sheets

DEVICE AND METHOD FOR THREE-DIMENSIONAL POSITIONING

CROSS REFERENCE TO RELATED APPLICATIONS

The present application claims priority under 35 U.S.C. §119 to German Patent Application No. 10 2010 034 792.2 filed Aug. 18, 2010, the entire disclosures of which is herein expressly incorporated by reference.

BACKGROUND AND SUMMARY OF THE INVENTION

The invention relates to a device and a method for three-dimensional positioning.

Three-dimensional positioning with stringent requirements for accuracy, availability, continuity, and integrity is important, for example, for the landing of helicopters. Problems may arise when there is little or no visual contact with the landing site. Various technologies are known for three-dimensional positioning during an approach; these are briefly described below, along with their disadvantages.

For example, the integration of the Global Positioning System (GPS) and an inertial navigation system (INS) is known. However, this cannot be used to meet the accuracy requirements for a three-dimensional position solution, which are necessary for an autonomous landing. In addition, differential correction data have only limited availability. Furthermore, this solution is susceptible to interference from jammers.

Also known is so-called precision approach radar, which, however, entails high operating costs. In addition, the user segment is not fully autonomous with regard to position determination and integrity monitoring, since the monitoring takes place in the ground segment instead of in the user segment. Lastly, this requires a costly ground segment having large mechanical dimensions and high power consumption.

Another known technology is a local two-dimensional radar positioning system, which, however, is limited to two-dimensional positioning and generally has less availability and continuity than a sensor data fusion approach using the Global Navigation Satellite System (GNSS) and an inertial measurement unit (IMU). Due to the system limitation to two-dimensional positioning, this system is suitable only for taxiing, not for landing assistance.

Lastly, an integrity beacon landing system is known, which, however, is susceptible to interference from jammers because it operates solely in the GNSS frequency band. High positional accuracy is achievable only by using carrier phase algorithms, which adversely affects availability and complicates the development of integrity concepts. In addition, this technology entails higher costs for the ground segment on account of the integrity beacons.

Reference is also made to the following publications concerning positioning solutions:

Thibaut G.: "Cost Benefit Analysis on Precision Approach and Landing Systems (PALS)—Final Report," NIAG SG-99 Final Report, Vol. 2, Document AC/224(ACG5) D(2007)0002, June 2007;

Cohen C. E., Pervan B. S., Cobb H. S., Lawrence D. G., Powell J. D., Parkinson B. W.: "Precision Landing of Aircraft Using Integrity Beacons," in Global Positioning System: Theory and Applications, Volume II, Vol. 164, American Institute of Aeronautics and Astronautics, Washington, D.C., 1996;

Greenspan R. L.: "GPS and Inertial Integration," in Global Positioning System Theory and Applications, Volume II, Vol. 164, American Institute of Aeronautics and Astronautics, Washington, D.C., 1996; and "SYMEO Local Positioning Radar System LPR-B 1 D," product documentation, Symeo GmbH, 2009.

Exemplary embodiments of the present invention provide improved three-dimensional positioning which ensures that the stringent requirements for accuracy, availability, continuity, and integrity are compatible with the position solution.

The invention provides for fusion of secondary radar measurements, GNSS measurements, and IMU data in an integration processor which determines a three-dimensional position based on the fused measurements and data. For the fusion, the integration processor is able to couple the measurements and data to a nonlinear filter. According to the invention, a three-dimensional position may be autonomously computed on the integration processor on the user side. This allows the integrity monitoring of the position solution directly at the user, where the information of an integrity alarm is needed first. The secondary radar system used for the purposes of the invention, which may be designed as frequency modulated continuous wave (FMCW) radar operating in the C-band (IEEE), has a base station which is attached to the user unit, and multiple transponder (stations) set up in a locally limited area. The range measurements between the base station and the transponders are based on propagation time measurements. The base station transmits FMCW radar signals, to which the transponders are synchronized within a fixed time period. After synchronization is complete, the transponders send back an FMCW response signal. To achieve good observability of the filter states as well as a high level of availability and integrity of the three-dimensional position solution when the measurements and data are coupled to a nonlinear filter, rough GNSS measurements and IMU data may be additionally processed in the nonlinear filter. The method is therefore robust with respect to signal shadowing and geometric limitations of the local secondary radar system.

One embodiment of the invention concerns a device for three-dimensional positioning, having a secondary radar base station, which is provided for the range measurement of transponders, and which has at least one radar antenna, a GNSS receiver, which is provided for measuring GNSS signals, and which has a GNSS receiver antenna, an inertial measuring unit, which is provided for determining the location of the GNSS receiver antenna and of the at least one radar antenna in a shared coordinate system in relation to a reference point, and an integration processor, which is supplied with pseudorange measurements of the GNSS receiver, radar range measurements, and motions of the device about the axes of the shared coordinate system measured by the inertial measuring unit, and which determines a three-dimensional position of a common reference point by fusion of the supplied measurements and data, a lever arm compensation being carried out which takes the measured motions into account.

As a result of the fusion of measurements and data from different sources, a robust and very reliable determination of a three-dimensional position of the reference point anchored in the user segment may be achieved, which is important, for example, for a safe approach of a helicopter.

The secondary base station may be designed to operate in the C-band (IEEE) and to use FMCW radar signals for the range measurement.

For the device, an inertial navigation system may be provided which contains the inertial measuring unit, and the integration processor may be designed to implement, outside an operational area of the secondary radar system, a three-dimensional position using a first coupled navigation based on the pseudorange measurements of the GNSS receiver and inertial navigation measurements of the inertial navigation system, and to implement, inside the operational area of the secondary radar base station, a three-dimensional position using a second coupled navigation based on the radar range measurements, the pseudorange measurements of the GNSS receiver, and the inertial navigation measurements of the inertial navigation system.

A three-dimensional position determination based on a GNSS and inertial navigation may thus be carried out, for example, in a flight phase in which the secondary radar base station is located too far from transponders of the ground segment, while in an approach phase in the vicinity of the transponders the range measurements between the radar antenna(s) and the transponders are additionally used for the three-dimensional positioning, which as a result of the lower measurement variances are assigned higher weighting than the pseudorange measurements of the GNSS receiver. Optimal three-dimensional positioning with regard to available measurements and associated measurement variances may thus be achieved in various flight phases.

For the present nonlinear filter problem, the integration processor may have a sigma point Kalman filter for processing the pseudorange measurements of the GNSS receiver, the IMU data, and the radar range measurements. Use of a sigma point Kalman filter avoids the situation that second-order or higher terms are completely ignored, which would be the case if the measurement equations were linearized. Taking nonlinearities into account is particularly relevant for the secondary radar measurements due to the small distances between the user segment and the transponder stations, since in this case second-order terms are no longer negligible with respect to the measurement noise.

The sigma point Kalman filter may be provided for determining INS navigation solution correction data based on the pseudorange measurements of the GNSS receiver and the radar range measurements, and the integration processor may execute a strapdown algorithm which, based on the correction data and the motions of the device about the axes of the shared coordinate system measured by the inertial measuring unit, determines the three-dimensional position.

Alternatively, the sigma point Kalman filter may be designed for determining the three-dimensional position based on the pseudorange measurements of the GNSS receiver, the radar range measurements, and an INS navigation solution, and for calibration purposes the determined three-dimensional position may be coupled back to an inertial navigation system of the device.

In particular, the sigma point Kalman filter should not proceed from linearization of a slant range between the at least one radar antenna and a transponder, but instead may also take into account nonlinear terms, in particular second-order terms.

In particular, a slant range r may be approximated using the following nonlinear function which also takes second-order terms into account:

$$\tilde{r}(x_{U,k}) = r(x_{U,k}^-) + (x_{U,k} - x_{U,k}^-)^T \nabla r(x_{U,k}^-) + \frac{1}{2}(x_{U,k} - x_{U,k}^-)^T H(x_{U,k}^-)(x_{U,k} - x_{U,k}^-)$$

where $x_{U,k}$ is a three-dimensional position vector between a transponder TP and the device U at time k, $x_{U,k}^-$ is a current approximation point, $\nabla r(x_{U,k}^-)$ is the vector of the partial derivative of r at point $x_{U,k}^-$, and $H(x_{U,k}^-)$ is the matrix of the second partial derivative of r at point $x_{U,k}^-$.

The nonlinear filter may use a nonlinear optimization method to solve the nonlinear filter problem, and in particular a sigma point Kalman filter or a second-order filter may be used for the optimization.

In addition, the nonlinear filter may implement a state model which has linear or nonlinear state equations, depending on the application of the device.

Another embodiment of the invention concerns the use of a device for three-dimensional positioning according to the preceding invention onboard a flying apparatus for navigating the approach to a landing site, in the boundary regions of which multiple secondary radar transponders for the secondary radar base station of the device are situated.

Lastly, another embodiment of the invention concerns a method for three-dimensional positioning, having the following steps:

Receiving radar range measurements of a secondary radar base station which is provided for range measurement for transponders and which has at least one radar antenna, Receiving pseudorange measurements of a GNSS receiver which is provided for measuring GNSS signals and which has a GNSS receiver antenna, Receiving motion measurements of an inertial measuring unit which is provided for determining the location of the GNSS receiver antenna and of the at least one radar antenna in a shared coordinate system in relation to a reference point, and Determining a three-dimensional position of a common reference point by fusing the pseudorange measurements of the GNSS receiver, the radar range measurements, and the data of the inertial measuring unit, taking into account a lever arm compensation between the reference point, the GNSS receiver, antenna, the at least one radar antenna, and the inertial measuring unit. As a result of the lever arm compensation, all measurements subsequently relate to the reference point. The lever arm compensation is necessary due to the fact that the GNSS receiver antenna, the radar antenna(s), and the inertial measuring unit are normally spatially separated.

The method may be implemented, for example, in an onboard computer of a flying apparatus, for example an airplane or helicopter, which already contains a GNSS receiver and a GNSS receiver antenna as well as an inertial measuring unit and optionally a secondary radar system. An existing flight navigation system may thus be equipped and improved due to the fact that precise and reliable three-dimensional positioning is made possible, also for the approach. The method may be implemented as software, which may be loaded on the onboard computer.

The method may be further characterized by the following steps:

Nonlinear filtering for determining INS navigation solution correction data based on the received pseudorange measurements and the received radar range measurements, and Executing a strapdown algorithm for determining the three-dimensional position based on the correction data and the received motion measurements, or Nonlinear filtering for determining the three-dimensional position based on the received pseudorange measurements, the received radar range measurements, and the INS navigation solution.

The nonlinear filtering may include the approximation of a slant range between the at least one radar antenna and a transponder using a nonlinear function, in particular a quadratic function as a special case, in particular the approximation of a slant range r as a special case, using the following nonlinear function:

$$\tilde{r}(x_{U,k}^-) = r(x_{U,k}^-) + (x_{U,k} - x_{U,k}^-)^T \nabla r(x_{U,k}^-) + \frac{1}{2}(x_{U,k} - x_{U,k}^-)^T H(x_{U,k}^-)(x_{U,k} - x_{U,k}^-)$$

where $x_{U,k}$ is a three-dimensional position vector between a transponder TP and the device U at time k, $x_{U,k}^-$ is a current approximation point, $\nabla r(x_{U,k}^-)$ is the vector of the partial derivative of r at point $x_{U,k}^-$, and $H(x_{U,k}^-)$ is the matrix of the second partial derivative of r at point $x_{U,k}^-$.

The nonlinear filtering may use a nonlinear optimization method for solving the nonlinear filter problem, and in particular may use a sigma point Kalman filter or a second-order filter for the optimization.

According to another embodiment, the present invention relates to a computer program for carrying out a method according to one embodiment of the present invention, and a non-transitory computer program product containing a machine-readable program medium on which the computer program may be stored in the form of electronically and/or optically readable control signals.

Further advantages and possible applications of the present invention result from the following description in conjunction with the exemplary embodiments illustrated in the drawings.

The terms used in the list of reference numerals provided at the end, as well as the associated reference numerals, are used in the description, claims, abstract, and drawings.

DETAILED DESCRIPTION OF THE DRAWINGS

Figure 1:
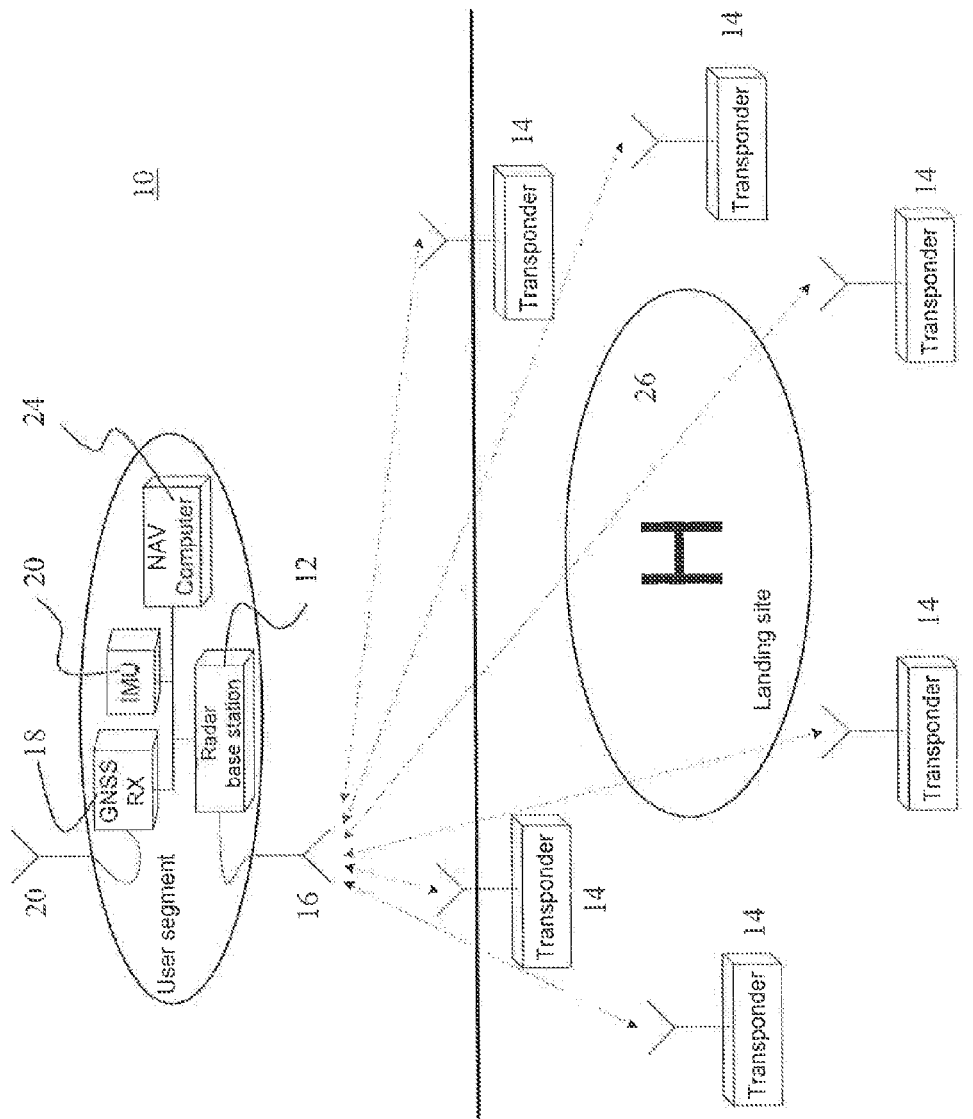
FIG. 1 shows one exemplary embodiment of the system architecture of a device for three-dimensional positioning according to the invention.

Identical, functionally identical, and functionally related elements are provided with the same reference numerals in the following description. Absolute values are stated below only by way of example, and are not to be construed as limiting to the invention.

The system architecture of a secondary radar-supported three-dimensional positioning system and a coupled nonlinear filter approach, based on a device 10 illustrated in FIG. 1, for precise three-dimensional positioning in a spatially delimited area according to the invention is described. The architecture has a ground segment having a landing site for helicopters, and a user segment which is located in a helicopter.

System Architecture

The ground segment and the user segment of the device 10 for precise three-dimensional positioning in a spatially delimited area have the following elements:

1) Ground Segment:

A variable number of secondary radar transponders 14 whose configuration may be adapted to local events, and whose antenna orientation may be optimized depending on the specific application. The transponders may be situated, for example, at the boundary regions of an approach zone—in FIG. 1, around the helicopter landing site 26—in order to identify the landing site using radar, in particular under poor visibility conditions, for example when ground fog is present.

2) User Segment:

a. A secondary radar base station 12 having at least one radar antenna 16 whose placement may be optimized, depending on the application, in order to avoid shadowing of the radar signals and multipath effects. An expansion to two or more radar antennas is possible without problems. Although multiple radar antennas may also be used at the user segment, for the sake of clarity the following descriptions concern a single radar antenna. The radar signals emitted from the base station (dashed lines in FIG. 1) are sent back by the transponders 14 of the ground segment.

b. A Global Navigation Satellite System (GNSS) receiver 18 having a GNSS receiver antenna 20. The GNSS receiver may be, for example, a receiver for signals from NAVSTAR GPS, GLONASS, or the future European GNSS Galileo.

c. An inertial measurement unit (IMU) 20 in order to relate the location of the GNSS receiver antenna and of the radar antenna(s) to a shared coordinate system anchored in the user segment.

d. A navigation computer 24 on which the sensor data fusion and the computation of the three-dimensional position solution of the user take place. The computer 24 also implements an integration processor for the sensor data, using the above-mentioned coupled nonlinear filter approach, to be described in detail below.

If the particular user segment by default has further sensors (an altimeter, for example), these additional sensor data may also be used to generate the position solution. The sensor assembly shown in FIG. 1 represents the minimum scope of the device, in which the secondary radar system 12, 14 is the core component. Satisfactory performance may be achieved using this minimum setup. Supplementation with temperature, pressure, and humidity sensors is possible in order to obtain better results in the modeling of propagation time delays caused by the troposphere.

The coordinates of the transponder antennas 14 in an absolute coordinate system are known to the user segment, so that the user segment is able to meaningfully include the radar range measurements in the nonlinear filter. The information concerning the transponder coordinates may either be statically stored in the user segment or dynamically transmitted to the user segment via a data link. If the transponders 14 are located on a mobile platform, an aircraft carrier, for example, the transponder absolute coordinates should be dynamically adapted.

The secondary radar system 12, 14 operates in the C-band (IEEE), and uses frequency modulated continuous wave (FMCW) radar signals for the range measurement. Precise range measurements at the secondary radar base station 12 of the user segment are available in short-to-medium range surroundings of the transponders 14 of the ground segment.

Highly accurate three-dimensional positioning may be performed within this spatially delimited area. The position solution within the operational area is characterized by a high level of availability and continuity and a very low integrity risk of not identifying impermissibly large position errors.

Figure 2:
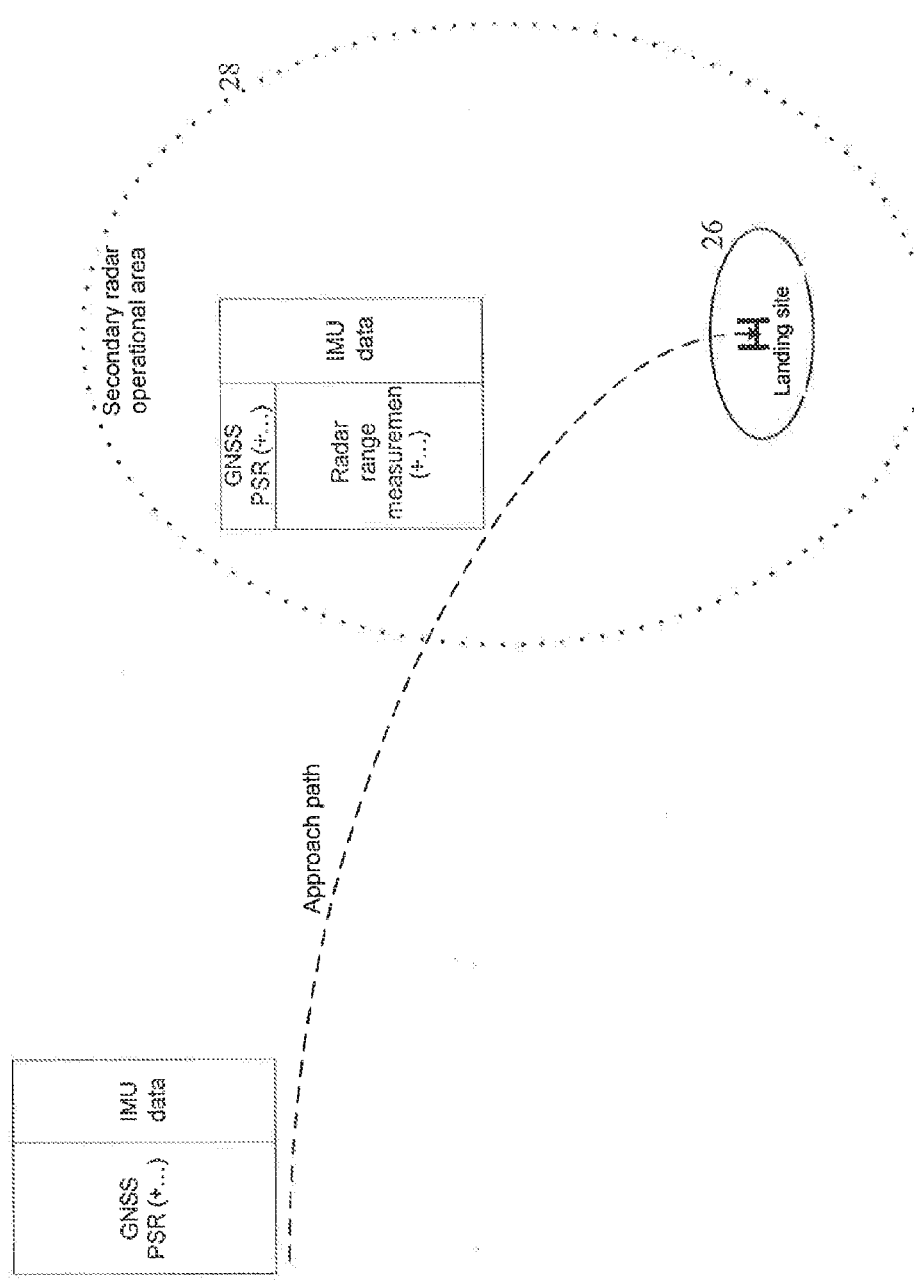
FIG. 2 shows the availability and weighting of the sensor data in the user segment in the course of an approach trajectory according to the invention.

The nonlinear filter also processes more noisy GNSS pseudorange measurements in addition to the low-noise range measurements of the secondary radar system 12, 14, for the following reasons. The secondary radar system covers a limited operational area, and is generally installed only in locations where high levels of positioning accuracy, availability, and continuity in addition to a low integrity risk are simultaneously required—in FIG. 1, at the landing site 26. As a rule, the requirements for the position solution are less stringent outside this area. The three-dimensional position solution upon approach to the critical operational area, for example the helicopter landing site 26 shown in FIG. 1, is improved by using the device according to the invention. This concept is illustrated in FIG. 2, using the example of an approach path or an approach trajectory. Low-noise radar range measurements are not available outside the secondary radar-operational area 28 (dotted line in FIG. 2), so that the three-dimensional position solution is based solely on a coupled (differential) GNSS/inertial navigation system (INS) navigation solution. A coupled secondary radar/(differential) GNSS/INS navigation solution is determined within the operational area 28. Due to the higher measurement variances, a much lower weighting may be assigned in the nonlinear filter to the GNSS pseudorange measurements than to the radar range measurements, which have significantly lower measurement variances.

In the operational area 28 of the secondary radar, i.e., in the vicinity of the landing site 26 in FIG. 1, the noisy pseudorange measurements may still be taken into account in the filter with a low weighting instead of just processing only the low-noise radar range measurements. The number of transponders 14 in the system may thus be kept low, and the positioning method is less susceptible to the failure of range measurements between the secondary radar base station 12 and individual transponders 14 due to shadowing. If only radar range measurements were used for the positioning, very large vertical dilution of precision (VDOP) values would result for the case in which the transponders antennas 14 and the radar antenna 16 of the user segment are located approximately in the same plane. When satellite signal measurements and radar signal measurements are combined in a coupled filter approach, this consistently results in very good horizontal dilution of precision (HDOP) and VDOP values within the operational area.

The user segment has three spatial rotational degrees of freedom. For the three-dimensional positioning concept it is necessary to know the orientation angle of the user segment, since on the user side two spatially separated antennas (radar antenna 16 and GNSS receiver antenna 20 in FIG. 1) are used for the GNSS signals and the radar signals. The necessary position information is obtained by integration of the IMU 20. The GNSS and radar measurements may thus be related to a common reference point by carrying out lever arm compensation. Other positive aspects regarding use of the IMU 20 are that the inertial system has a high level of availability, high data rates may be achieved, and a complete navigation solution may be determined for all six degrees of freedom of the user segment.

Coupled Nonlinear Filter Approach

The sensor data listed below are fused on the user side to obtain a highly accurate three-dimensional position solution. Due to the sensor combination selected, a complete navigation solution may be determined which goes beyond mere three-dimensional position information. In order for the sensor data fusion to result in a highly accurate position solution, the spatial differences between the GNSS antenna position, the radar antenna position(s), and the inertial sensor assembly (ISA) in the measurement model of the filter are taken into account. The differences between the sensor data reference points (GNSS antenna phase center, radar antenna phase center, ISA) are determined during the system installation, for example in north-east-down (NED) coordinates. As a common reference point, the ISA is selected below so that after the system installation, the two displacement vectors $\delta_{Radar,NED}$ and $\delta_{GNSS,NED}$ may be stated. The roll, pitch, and yaw angles of the user segment are observable by using the IMU 22 in the user segment. The information concerning the GNSS and radar observation equations may be related to a shared (reference) coordinate system with the aid of the continuously updated position information and the predetermined displacement vectors $\beta_{Radar,NED}$ and $\delta_{GNSS,NED}$.

The individual sensor output data are listed below. The processing of some data is optional, so that a high level of computational effort may be balanced against increased performance by using additional independent measurements in the filter.

Figure 3:
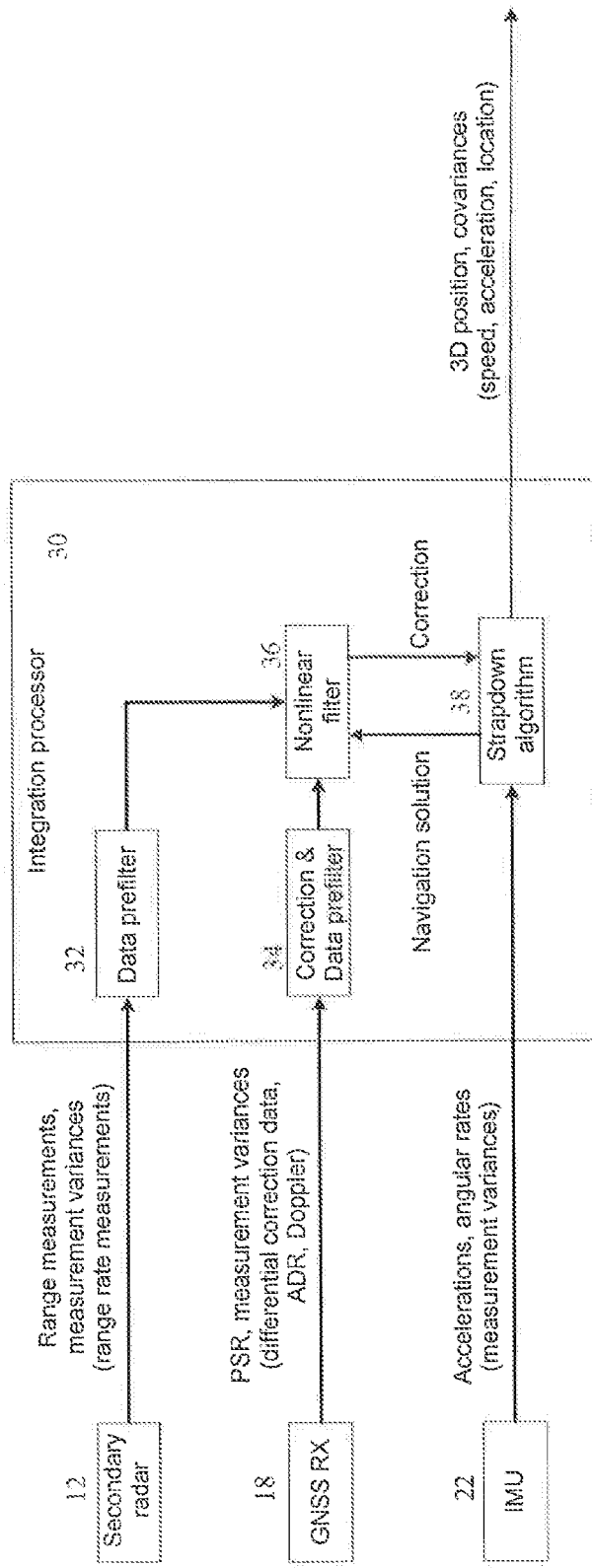
FIG. 3 shows a coupled approach for secondary radar, GNSS RX, and IMU sensor data according to the invention.

The secondary radar system 12 delivers the following measurements on the user side:
  Slant ranges for n transponders 14 of the ground segment—
  Optional: range rates for n transponders 14 of the ground segment
  Quality factors and/or variances pertaining to the measurements The GNSS receiver 18 delivers the following variables as the sensor output:
  Pseudoranges (slant ranges plus error counts) for m satellites
  Optional: Doppler for m satellites
  Optional: accumulated Doppler range (ADR) for m satellites
  Optional: differential correction data (SBAS, for example) which are applied to the GNSS receiver measurements
  Standard deviations of the measurements The IMU 22 delivers measurements concerning:
  Acceleration for each axis
  Angular rate for each axis FIG. 3 shows a coupled approach for secondary radar, GNSS RX, and IMU sensor data, in which "rough" acceleration and angular rate measurements of the IMU 22 are processed in the integration processor 30. Distance measurements, measurement variances, and optionally range rate measurements are supplied by the secondary radar base station 12 to a data prefilter 32 of the integration processor 30. In addition, pseudorange (PSR) measurements, measurement variances, and optionally differential correction data, ADR measurements, and Doppler measurements are supplied to a correction and data prefilter 34 of the integration processor 30. The output data of the two filters 32 and 34 are supplied to a nonlinear filter 36 of the integration processor 30 which, based on these measurements and an INS navigation solution, computes correction data 38 which are processed by a strapdown algorithm 38, executed by the integration processor 30, for determining the three-dimensional position. The strapdown algorithm 38 is also supplied with accelerations, angular rates, and optionally measurement variances which have been measured by the IMU 22. These measured motions of the device 10 are likewise processed by the strapdown algorithm 38. As a result, the inertial processor 30 is able to output further determined data such as covariances, speed, acceleration, and location in addition to the three-dimensional position.

Figure 4:
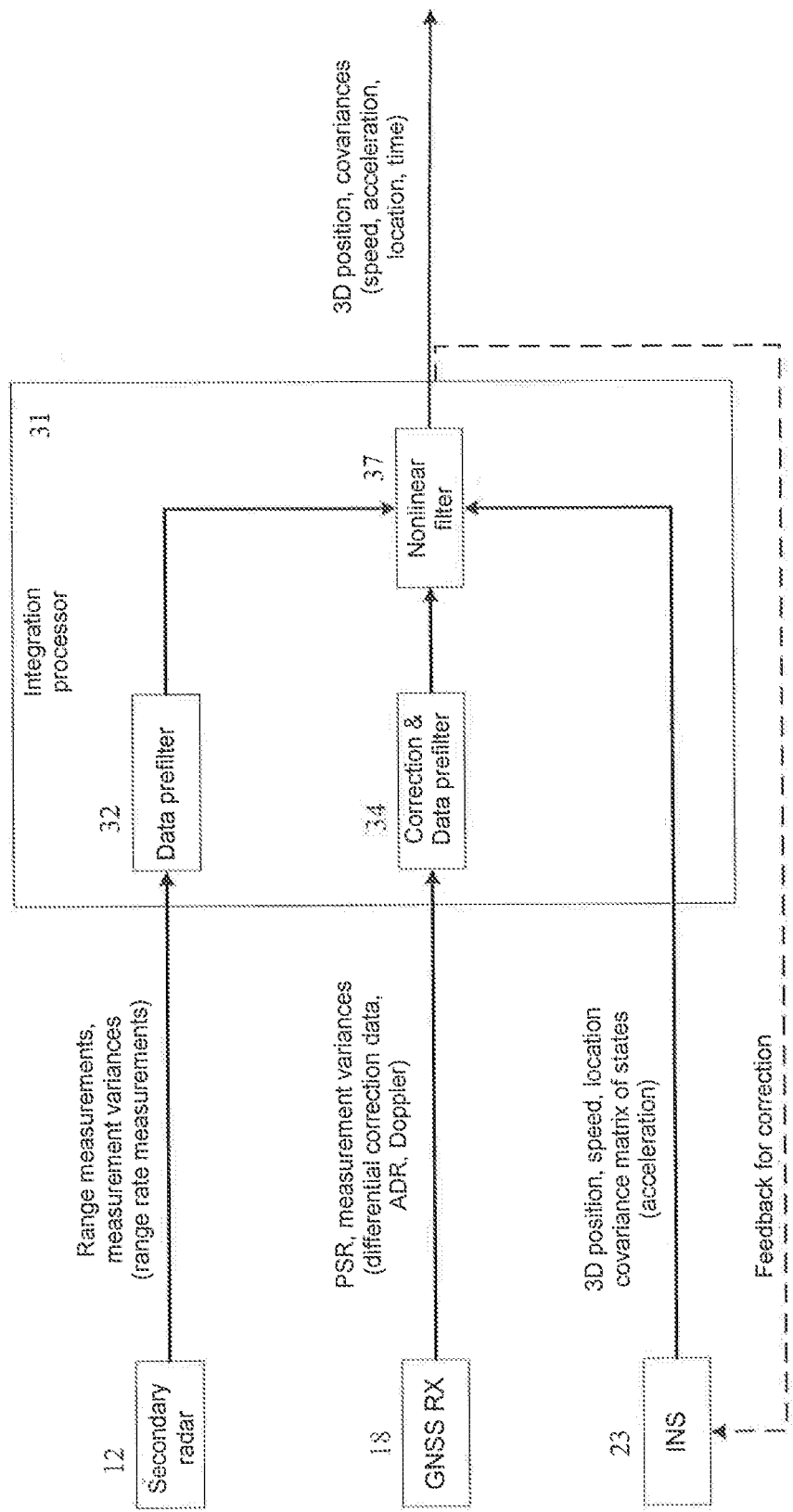
FIG. 4 shows a coupled approach for secondary radar and GNSS RX sensor data integrated with an INS navigation solution according to the invention.

If the IMU is already integrated with a navigation computer on the user side, in the coupled approach for secondary radar and GNSS RX sensor data shown in FIG. 4 the INS navigation solution may be further processed directly in the integration processor 31. The nonlinear filter 37 of the integration processor 31 is supplied with the filtered output data of the two filters 32 and 34, as well as a three-dimensional position determined by the inertial navigation system (INS) 23, speed, location, covariance matrix of the states, and optionally acceleration of the device 10. In contrast to the approach shown in FIG. 3, the nonlinear filter 37 uses the supplied data to determine not correction data, but, rather, the three-dimensional position of the device 10 which is output by the integration processor 31, in particular together with further data such as covariances, speed, acceleration, location, and time. The determined position solution is also used for supporting the separate inertial navigation system.

The two methods used in the integration processors 30 and 31 for sensor data integration of secondary radar, GNSS RX, and IMU measurements in the nonlinear filters 36 and 37 are explained below. The methods may be used as alternatives to one another.

A nonlinear measurement model is used for the secondary radar measurements due to the small distances between the user segment and the transponder stations, and the quickly changing user/transponder geometry in the operational area. The radar range measurement $s_k$ between a transponder TP and the user U, using the three-dimensional position vector $\underline{x}_{U,k}$ at time k, may be expressed as follows:

$$s_k = r(\underline{x}_{U,k}) + v_k$$

where the geometric slant range $r(\underline{x}_{U,k})$ is defined as follows:

$$r(\underline{x}_{U,k}) = \sqrt{(x^{TP} - x_{U,k})^2 + (y^{TP} - y_{U,k})^2 + (z^{TP} - z_{U,k})^2}$$

The variable $v_k$ represents the measurement noise plus uncorrected error counts such as multipath and calibration errors. In the current approximation point $\underline{x}_{U,k}^-$, the function r is not approximated by a linear function, as is customary for GNSS measurements. One option is to approximate r by a quadratic function $\tilde{r}$ which better represents the nonlinearities of the secondary radar system:

$$\tilde{r}(\underline{x}_{U,k}) = r(\underline{x}_{U,k}^-) + (\underline{x}_{U,k} - \underline{x}_{U,k}^-)^T \nabla r(\underline{x}_{U,k}^-) + \frac{1}{2}(\underline{x}_{U,k} - \underline{x}_{U,k}^-)^T H(\underline{x}_{U,k}^-)(\underline{x}_{U,k} - \underline{x}_{U,k}^-)$$

$\nabla r(\underline{x}_{U,k}^-)$ is the vector of the partial derivative of r at point $\underline{x}_{U,k}^-$, and $H(\underline{x}_{U,k}^-)$ is the matrix of the second partial derivative of r at point $\underline{x}_{U,k}^-$. For example, a second-order filter may be used for the optimization. A sigma point Kalman filter is also well suited for the present nonlinear filter problem. In general, a nonlinear optimization method is to be used, so that simple linearization of the slant range equations is not assumed.

The state models used in the filter may be adapted to the specific application. Linear or nonlinear state equations may be better suited, depending on the application.

Robustness of the System

The described method is robust with respect to jamming, since not all of the sensors selected here are simultaneously influenced to the same degree by a jammer. The radar system is operated in the C-band, whereas GNSS operates in the L-band. Another significant difference is that the GNSS receiver in the user segment is passive, while the secondary radar base station in the user segment is an active component.

Interference with GNSS or the radar system may be easily detected due to the high level of measurement redundancy within the critical operational area. The robustness of the system is further increased by the use of an IMU, which is largely insensitive to jammers. The output of the three-dimensional position solution on the integration processor is preceded by an integrity test of the solution. Besides strictly error recognition methods, error exclusion methods may also be implemented on the integration computer, thus achieving a very high level of availability of the position solution.

In particular, the following advantages may be achieved by the present invention and by embodiments of the invention:

In addition to the high accuracy of the three-dimensional position solution, a high level of availability, continuity, and integrity of the position solution may be simultaneously achieved within a spatially delimited area.

High update rates of the position solution are achievable.

The system is more robust with respect to jamming than other system proposals for Precision Approach and Landing Systems (PALS), due to the selected sensor data fusion which combines the various measurement principles with one another, and the coupled filter approach.

The positioning occurs autonomously on the user side: the integrity monitoring of the position solution may take place directly in the user unit. There is little complexity for the operator, and no additional data link between the ground segment and the user segment is necessary.

Small mechanical dimensions, low power consumption, and low acquisition and operating costs of the local augmentation system, i.e., of the secondary radar base and transponder stations.

The GPS receiver and antenna as well as IMU are already installed in many user segments in the aviation sector, so that on the user side it is necessary only to add a secondary radar base station and antenna(s). Existing onboard computers may be used to implement the nonlinear filter algorithms.

The secondary radar ground segment may be easily installed on mobile platforms (aircraft carriers, for example).

The present invention has the potential for providing a three-dimensional position solution in a spatially delimited area (for example, in the surroundings of helicopter landing sites) while meeting the requirements for accuracy, availability, and integrity imposed for aviation applications. Thus, the risk of accidents may be drastically reduced, and time and costs may be saved, by the possibility of performing autonomous landings when there is little or no visibility of the landing site. The present invention is also robust with respect to interference sources.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

| REFERENCE NUMERALS AND ACRONYMS | |
|---|---|
| 10 | Device for three-dimensional positioning |
| 12 | Secondary radar base station |
| 14 | Secondary radar transponder |
| 16 | Radar antenna |

| REFERENCE NUMERALS AND ACRONYMS | |
| --- | --- |
| 18 | GNSS receiver/GNSS RX |
| 20 | GNSS receiver antenna |
| 22 | IMU |
| 23 | INS |
| 24 | Navigation computer |
| 26 | Helicopter landing site |
| 28 | Secondary radar-operational area |
| 30, 31 | Integration processor |
| 32 | Data prefilter for radar range measurements |
| 34 | Correction and data prefilter for pseudorange measurements |
| 36 | Nonlinear filter |
| 38 | Strapdown algorithm |
| FMCW | Frequency modulated continuous wave |
| GNSS | Global Navigation Satellite System |
| HDOP | Horizontal dilution of precision |
| IMU | Inertial measuring unit |
| INS | Inertial navigation system |
| ISA | Inertial sensor assembly |
| NED | North-east-down |
| RX | Receiver |
| SBAS | Satellite-based augmentation system |
| VDOP | Vertical dilution of precision |

What is claimed is:

1. A device (10) for three-dimensional positioning, comprising:
a secondary radar base station with at least one radar antenna, the secondary radar base station arranged to perform range measurement for transponders;
a global navigation satellite system (GNSS) receiver with a GNSS receiver antenna, the GNSS receiver arranged to measure GNSS signals;
an inertial measuring unit, which is arranged to determine a location of the GNSS receiver antenna and of the at least one radar antenna in a shared coordinate system in relation to a reference point; and
an integration processor, which is arranged to be supplied with pseudorange measurements of the GNSS receiver, radar range measurements, and motions of the device about an axes of the shared coordinate system measured by the inertial measuring unit, and which is arranged to determine a three-dimensional position of a common reference point by fusion of the pseudorange measurements, radar range measurements and motions of the device, wherein a lever arm compensation is carried out that accounts for the measured motions.

2. The device according to claim 1, wherein the secondary base station operates in a C-band frequency band and uses frequency modulated continuous wave (FMCW) radar signals for the range measurement for the transponders.

3. The device according to claim 1, wherein an inertial navigation system contains the inertial measuring unit, and
wherein the integration processor is arranged to determine, outside an operational area of the secondary radar base station, a three-dimensional position using a first coupled navigation based on the pseudorange measurements of the GNSS receiver and inertial navigation measurements of the inertial navigation system, and the integration processor is further arranged to determine, inside the operational area of the secondary radar base station, a three-dimensional position using a second coupled navigation based on the radar range measurements, the pseudorange measurements of the GNSS receiver, and the inertial navigation measurements of the inertial navigation system.

4. The device according to claim 1, wherein the integration processor has a nonlinear filter arranged to process the pseudorange measurements of the GNSS receiver, inertial measurement unit data, and the radar range measurements.

5. The device according to claim 4, wherein the nonlinear filter is arranged to determine inertial navigation system navigation solution correction data based on the pseudorange measurements of the GNSS receiver and the radar range measurements, and
the integration processor is arranged to execute a strapdown algorithm which, based on the correction data and the motions of the device about the axes of the shared coordinate system measured by the inertial measuring unit, determines the three-dimensional position.

6. The device according to claim 4, wherein the nonlinear filter is arranged to determine the three-dimensional position based on the pseudorange measurements of the GNSS receiver, the radar range measurements, and the inertial navigation system navigation solution, and
for calibration purposes, the determined three-dimensional position is coupled back to the inertial navigation system of the device.

7. The device according to claim 4, wherein the nonlinear filter is arranged to approximate a slant range r between the at least one radar antenna and one of the transponders using the following nonlinear function:

$$\tilde{r}(x_{U,k}) = r(x_{U,k}^-) + (x_{U,k} - x_{U,k}^-)^T \nabla r(x_{U,k}^-) + \frac{1}{2}(x_{U,k} - x_{U,k}^-)^T H(x_{U,k}^-)(x_{U,k} - x_{U,k}^-)$$

where $x_{U,k}$ is a three-dimensional position vector between a transponder TP and the device U at time k, $x_{U,k}^-$ is a current approximation point, $\nabla r(x_{U,k}^-)$ is the vector of the partial derivative of r at point $x_{U,k}^-$, and $H(x_{U,k}^-)$ is the matrix of the second partial derivative of r at point $x_{U,k}^-$.

8. The device according to claim 7, wherein the nonlinear filter is arranged to use a sigma point Kalman filter or a second-order filter for nonlinear optimization.

9. The device according to claim 4, wherein the nonlinear filter is arranged to implement a state model having linear or nonlinear state equations, depending on an application of the device.

10. A method for three-dimensional positioning, the method comprising the steps of:
receiving radar range measurements of a secondary radar base station, which is provided for range measurement for transponders and which has at least one radar antenna;
receiving pseudorange measurements of a global navigation satellite system (GNSS) receiver, which is provided for measuring GNSS signals and which has a GNSS receiver antenna;
receiving motion measurements of an inertial measuring unit, which is provided for determining the location of the GNSS receiver antenna and of the at least one radar antenna in a shared coordinate system in relation to a reference point; and
determining, by an integration processor, a three-dimensional position of a common reference point by fusing the pseudorange measurements of the GNSS receiver, the radar range measurements, and the motion measurements of the inertial measuring unit, taking into account a lever arm compensation between the reference point, the GNSS receiver antenna, the at least one radar antenna, and the inertial measuring unit.

11. The method according to claim 10, further comprising the steps of:
nonlinear filtering to determine inertial navigation system navigation solution correction data based on the received pseudorange measurements and the received radar range measurements; and
executing a strapdown algorithm to determine the three-dimensional position based on the correction data and the received motion measurements, or
nonlinear filtering to determine the three-dimensional position based on the received pseudorange measurements, the received radar range measurements, and the received inertial navigation system navigation solution.

12. The method according to claim 11, wherein the nonlinear filtering includes an approximation of a slant range between the at least one radar antenna and one of the transponders using the following nonlinear function:

$$\tilde{r}(\underline{x}_{U,k}) = r(\overline{x_{U,k}^-}) + (x_{U,k}^- - \overline{x_{U,k}^-})^T \nabla r(\overline{x_{U,k}^-}) + \frac{1}{2}(x_{U,k} - \overline{x_{U,k}^-})^T H(\overline{x_{U,k}^-})(x_{U,k} - \overline{x_{U,k}^-})$$

where $\underline{x}_{U,k}$ is a three-dimensional position vector between a transponder TP and the device U at time k, $\underline{x}_{U,k}^-$ is a current approximation point, $\nabla r(\underline{x}_{U,k}^-)$ is the vector of the partial derivative of r at point $\underline{x}_{U,k}^-$, and $H(\underline{x}_{U,k}^-)$ is the matrix of the second partial derivative of r at point $\underline{x}_{U,k}^-$.

13. The method according to claim 12, wherein the nonlinear filtering uses a sigma point Kalman filter or a second-order filter for optimization.

14. A non-transitory computer program product containing a machine-readable program medium on which a computer program is stored, wherein the computer program, when executed by a processor, causes the processor to:
receive radar range measurements of a secondary radar base station, which is provided for range measurement for transponders and which has at least one radar antenna;
receive pseudorange measurements of a global navigation satellite system (GNSS) receiver, which is provided for measuring GNSS signals and which has a GNSS receiver antenna;
receive motion measurements of an inertial measuring unit, which is provided for determining the location of the GNSS receiver antenna and of the at least one radar antenna in a shared coordinate system in relation to a reference point; and
determine a three-dimensional position of a common reference point by fusing the pseudorange measurements of the GNSS receiver, the radar range measurements, and the motion measurements of the inertial measuring unit, taking into account a lever arm compensation between the reference point, the GNSS receiver antenna, the at least one radar antenna, and the inertial measuring unit.

* * * * *